United States Patent Office 3,260,849
Patented July 12, 1966

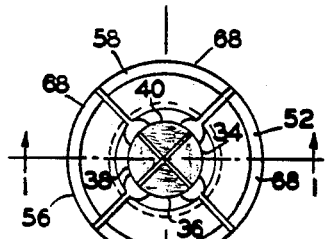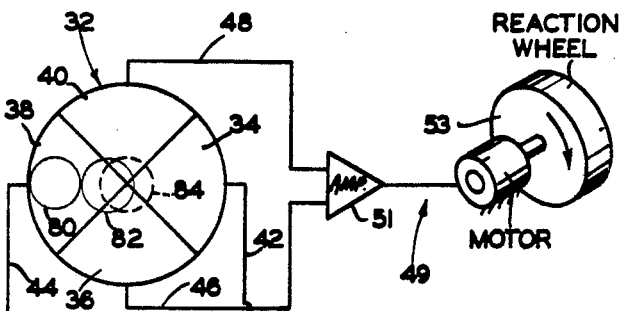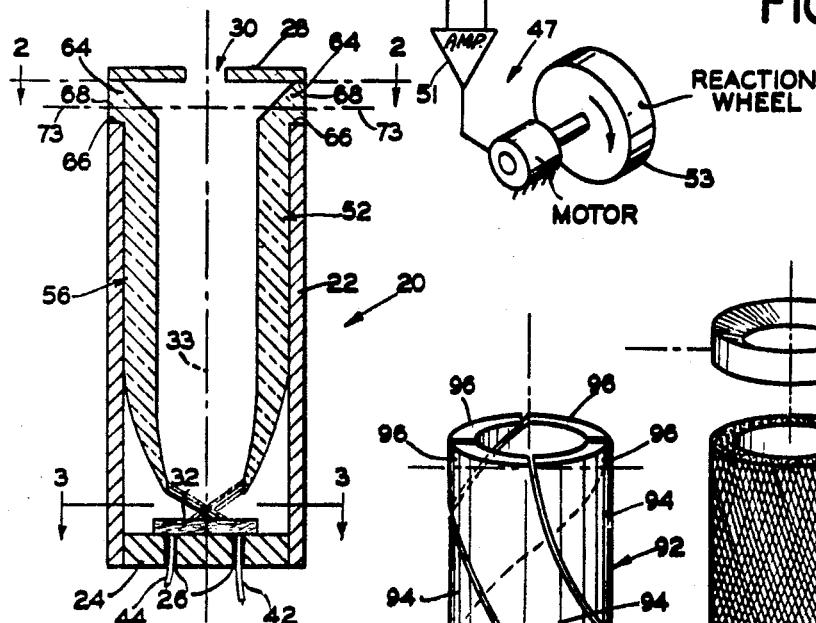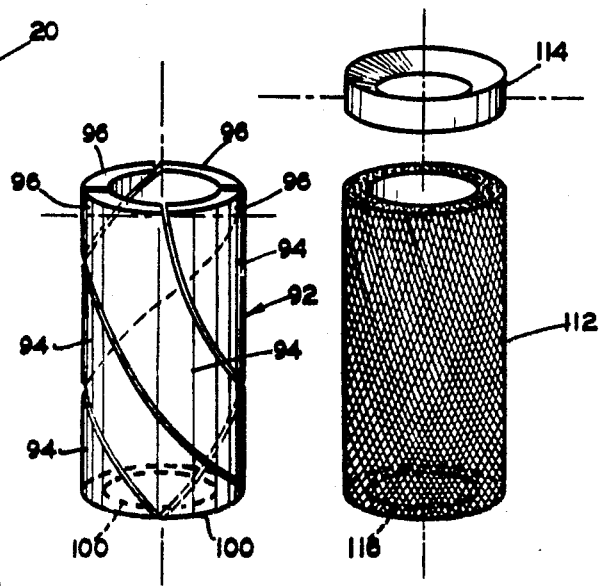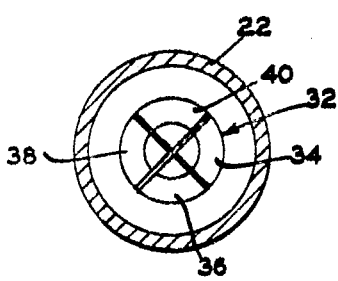
INVENTOR.
WILLIAM R. POLYE
ATTORNEY

1

3,260,849
LIGHT SENSITIVE ORIENTING DEVICE
William R. Polye, River Edge, N.J., assignor to The Bendix Corporation, Teterboro, N.J., a corporation of Delaware
Filed Mar. 9, 1962, Ser. No. 178,610
11 Claims. (Cl. 250—203)

This invention relates to light sensing devices and more particularly to a light sensing device for controlling orientation of an object relative to the sun or other light source.

The sensing device of the present invention is particularly adapted to establish a reference for the attitude control of space vehicles. The propulsion of a vehicle into space is usually followed by a period of random tumbling which must be overcome by applying suitable reaction controls to the vehicle until the vehicle assumes a desired attitude in space relative to a preselected reference. When the sun is used as a reference, the sensor should be capable of locating the sun over a substantial solid angle and accurately control the vehicle by providing electrical signals of a sense and magnitude corresponding to the attitude of the vehicle in space relative to the sun. Prior art sun sensors have a small sun locating range. In addition, they are bulky, heavy and unreliable in that they employ many detectors.

One object of the present invention is to provide a reliable, light-weight, compact, light sensing device which locates a light source, such as the sun, over a large solid angle.

Another object of the invention is to provide a light sensing device having coarse optical means to locate the light source over a large solid angle and fine optical means to bore-sight on the light source within a small solid angle.

Another object of the invention is to convert light signals from the coarse and fine optical means into control signals corresponding to the attitude of the vehicle relative to the light source.

Another object of the invention is to control the attitude of the vehicle relative to the light source.

The invention contemplates a light sensing device comprising a light sensitive detector providing an electrical signal when exposed to light, means for directing the light from a source onto the detector to provide signals corresponding to the attitude of the detector relative to the light source including a coarse optical system for detecting the light source over a substantial angle and a fine optical system for detecting the light source within a relatively small angle.

The foregoing and other objects and advantages of the invention will appear more fully hereinafter from a consideration of the detailed description which follows, taken together with the accompanying drawing wherein three embodiments of the invention are illustrated. It is to be expressly understood, however, that the drawing is for the purpose of illustration and description only, and is not to be construed as defining the limits of the invention.

In the drawing:

FIGURE 1 is a transverse vertical section taken along line 1—1 of FIGURE 2 and shows one embodiment of the invention.

FIGURE 2 is a horizontal section taken along line 2—2 of FIGURE 1.

FIGURE 3 is a horizontal section taken along line 3—3 of FIGURE 1.

FIGURE 4 is a schematic diagram of a control system for orienting a vehicle in space about two mutually perpendicular axes including a light sensing device constructed according to the invention.

2

FIGURES 5 and 6 are schematic views of alternative forms of coarse light directing means of FIGURE 1.

Referring now to the drawing and more particularly to FIGURES 1 to 4, shown therein is a novel light sensing device 20 constructed according to the present invention and comprising a cylindrical housing 22 fixed to the vehicle and made of light weight material. Housing 22 has a bottom closure 24 and a top closure 28 with a central circular aperture 30 therein.

A light sensitive detector 32 is centrally secured to bottom closure 24 within cylindrical housing 22. Detector 32 is divided into four equal segments or quadrants 34, 36, 38 and 40. Each quadrant may comprise a photovoltaic detector, such as selenium, silicon, or cadmium sulfide, which generates a voltage or current when exposed to light. Opposed segments 34 and 38 are connected in opposition to one another to suitable control equipment 47 by leads 42 and 44 for controlling the vehicle about one axis X. Opposed segments 36 and 40 are connected to suitable control equipment 49 by leads 46 and 48 for controlling the vehicle about an axis Y at right angles to the axis X. Control leads 42, 44, 46 and 48 may extend through apertures 26 in bottom closure 24 for connection to control equipment 47, 49 in a well-known manner. Control equipment 47, 49 may comprise an amplifier 51 and a reaction wheel 53 for orienting the vehicle about the associated axis.

The light sensing device 20 has light receiving means in the form of a coarse optical system for detecting the light source when the light source is disposed at an angle greater than about 20 degrees from the axis of the sensing device and a fine optical system for bore-sighting on the light source when the light source is within an angle of about 20 degrees. The coarse optical system comprises four transparent elongated members 52, 54, 56 and 58, extending from the top of housing 22 downwardly within a short distance of detector 32. Each member 52, 54, 56 and 58 has a light gathering surface 68 extending radially from housing 22 just below top closure 28 and directs light from the light gathering surface to detector 32. Members 52, 54, 56 and 58 at their ends adjacent to detector 32 are curved to direct the light to the segment at the opposite side of detector 32. For example, member 52 directs the light to segment 38; member 56 directs the light to segment 34; member 54 directs the light to segment 40; and, member 58 directs the light to segment 36. This arrangement is necessary in order to maintain the same control sense as the fine optical system described hereinafter.

The fine optical system comprises aperture 30, which may be provided with a suitable lens, if desired, for directing the light in a beam onto detector 32 when the source is within an angle of 20 degrees, for example, of the axis of sensing device 20. When the light source is at one side of the axis of light sensing device 20, the beam of light falls upon the segment at the opposite side of the axis.

Light gathering surfaces 68 of the coarse optical system are positioned at right angles to the plane of aperture 30 of the fine optical system so that the light sensing device will locate the light source within a solid angle of at least $2\pi$ steradians.

When the light source is positioned at an angle greater than about 20 degrees from the axis of light sensing device 20, the light from the source strikes a light gathering surface 68 of a member 52, 54, 56 or 58 and the member directs the light beam, shown at 80, onto the associated segment of detector 32. The illuminated segment 38 generates a higher voltage or current than the opposite segment 34 and energizes the associated amplifier 51 and reaction wheel 53 to orient the vehicle in a direction to align the axis of light sensing device 20 with the light source. When the light source is not centered but within an angle of about 20 degrees of the axis of light sensing device 20, the light from the source when within a solid angle of $\pi/9$ steradians is directed through aperture 30 onto segment 38, as shown at 82, and the illuminated segment 38 generates a higher voltage or current than the opposite segment 34 and the reaction wheel is energized in a direction to orient the vehicle so that the light source is aligned with the axis of light sensing device 20. When the light source is centered relative to light sensing device 20, the light from the source is directed through aperture 30 and equally illuminates the four segments 34, 36, 38 and 40 of detector 32, as shown by dotted lines at 84, and equal voltages or currents are generated by the segments and the net output is zero. When the vehicle moves to a position so that the light source is out of alignment with the axis of light sensing device 20, but within an angle of 20 degrees of the axis, then the light beam is directed through aperture 30 onto one of the segments, depending upon the orientation of the vehicle, and the vehicle is re-oriented by the associated reaction wheel as described.

FIGURE 5 shows another embodiment of a coarse optical system comprising a transparent cylindrical member 92 including four members 94 of light conducting material spiraled through an angle of 180 degrees. Each member is provided with a light gathering portion 96 and a terminal portion 100 adjacent to an associated segment 34, 36, 38, 40.

In FIGURE 6 is shown another embodiment of a coarse optical system comprising a cylindrical portion 112 having a circular light gathering portion 114. Cylindrical portion 112 comprises a plurality of aligned transparent fiber optics spiraled through an angle of 180 degrees. Cylindrical portion 112 has a terminal portion 116 adjacent to segments 34, 36, 38 and 40. Each of these arrangements provides for receiving light at one side of the device and directing the light to the segment at the opposite side of detector 32 as described in connection with FIGURE 1. The operation of the device is the same as in FIGURE 1.

The light sensing device 20 of the present invention is especially suited for use with the sun as a light sensor to establish a reference for controlling the attitude of a space vehicle. The device is reliable, light in weight, compact and simple in construction. The coarse optical system permits the device to locate the sun over a large solid angle of at least $2\pi$ steradians, and the fine optical system accurately provides for aligning the sun with the axis of the device.

While several embodiments of the invention have been illustrated and described, it is to be expressly understood that the invention is not limited thereto. Various changes may also be made in the design and arrangement of the parts without departing from the spirit and scope of the invention as the same will now be understood by those skilled in the art. For example, the term "light" is used herein to denote any type radiation which obeys accurately the laws of geometrical optics and need not necessarily be visible light.

What is claimed is:

1. A single light sensing device for determining the attitude of the device relative to a light source, comprising a light sensitive detector providing an electrical signal when exposed to light, a coarse optical system for detecting the light source over a substantial solid angle and a fine optical system for detecting the light source within a relatively small solid angle, the coarse optical system and the fine optical system having light gathering means disposed at substantially 90 degrees to one another and being positioned and arranged relative to the detector to direct light from the source onto the same segments of the detector to provide signals corresponding to the attitude of the detector relative to the light source.

2. A light sensing device for determining the attitude of the device relative to a light source, comprising a light sensitive detector divided into a plurality of segments each providing an electrical signal when exposed to light, a coarse optical system for detecting the light source over a substantial angle and a fine optical system for detecting the light source within a relatively small angle, said optical systems being positioned and arranged relative to the detector to direct light from the source onto the segments in accordance with the attitude of the detector relative to the light source to provide signals corresponding to the attitude of the detector relative to the light source, both of said systems directing the light from the source onto the same segment of the detector when the attitude of the detector relative to the light source is in the same angular sense to maintain the same control sense between the coarse and fine optical systems.

3. A light sensing device for determining the attitude of the device relative to a light source, comprising a light sensitive detector divided into a plurality of segments each providing an electrical signal when exposed to light, means for directing light from the source onto the segments in accordance with the attitude of the detector relative to the light source to provide signals corresponding to the attitude of the detector relative to the light source, the directing means including a coarse optical system for detecting the light source over a substantial solid angle and a fine optical system for detecting the light source within a relatively small solid angle, the coarse optical system and the fine optical system having light gathering means disposed at substantially 90 degrees to one another, both of said systems being positioned and arranged to direct light from the source onto the same segment of the detector when the attitude of the detector relative to the light source is in the same angular sense to maintain the same control sense between the coarse and fine optical systems.

4. A light sensing device for determining the attitude of the device relative to a light source, comprising a coarse optical system for providing light signals corresponding to the attitude of the sensing device relative to the light source, a fine optical system substantially perpendicularly related to the coarse optical system for providing light signals corresponding to the attitude of the sensing device relative to the light source, said coarse optical system sensing the light source over a large solid angle and said fine optical system sensing the light source over a small solid angle, and a single light sensitive detector positioned and arranged with respect to the coarse and fine optical systems to receive light signals therefrom and provide electrical signals corresponding to the attitude of the sensing device relative to the light source.

5. A light sensing device for determining the attitude of the device relative to a light source, comprising a housing, a light sensitive detector mounted in the housing, fine light receiving means for receiving light from the source within a relatively small solid angle and positioned and arranged to cast a beam of light on a portion of the light sensitive detector corresponding to the attitude of the detector relative to the source and coarse light receiving means disposed at substantially 90 degrees to the fine light receiving means for receiving light from the source over a relatively large solid angle and positioned and arranged to cast a beam of light on a portion of the light sensitive detector corresponding to the attitude of the detector relative to the source and in the same sense as the fine light receiving means.

6. Means for controlling the attitude of a space vehicle from the sun comprising a light sensing device including a light sensitive detector divided into a plurality of segments each providing an electrical signal when exposed to rays of the sun, a coarse optical system for detecting the sun over a substantial solid angle and a fine optical system for detecting the sun within a relatively small solid angle, said optical systems being positioned and arranged relative to the detector to direct the rays from the sun onto the segments in accordance with the attitude of the vehicle relative to the sun to provide signals corresponding thereto, both of the systems directing rays from the sun onto the same segment of the detector when the attitude of the vehicle relative to the sun is in the same angular sense to maintain the same control sense between the coarse and fine optical systems, and means responsive to the signals for orienting the vehicle to a desired attitude.

7. A light sensing device for determining the attitude of the device relative to a light source, comprising a housing, a light sensitive detector divided into four segments and mounted at one end of the housing, light receiving means for receiving light from the source and casting a beam of light on the segment of the light sensitive detector corresponding to the attitude of the detector relative to the source, the light receiving means including four spirally shaped elongated members of light conducting material extending substantially the length of the housing and having a light gathering surface at the end of the housing opposite the light sensitive detector, said members being spiraled through an angle of substantially 180 degrees so that the gathering surface receives light at one side of the housing and the member directs the light to a segment of the detector at the opposite side of the housing.

8. A light sensing device for determining the attitude of the device relative to a light source, comprising a housing, a light sensitive detector divided into four segments and mounted at one end of the housing, light receiving means for receiving light from the source and casting a beam of light on the segment of the light sensitive detector corresponding to the attitude of the detector relative to the source, the light receiving means including a cylindrically shaped member extending substantially the length of the housing and having a light gathering surface at the end of the housing opposite the light sensitive detector, said member including a plurality of aligned transparent fiber optics spiraled through an angle of substantially 180 degrees so that the gathering surface receives light at one side of the housing and the member directs light to a segment of the detector at the opposite side of the housing.

9. A light sensing device for determining the attitude of the device relative to a light source, comprising a light sensitive detector for providing a control signal the sense of which is determined by the portion of the light sensitive detector upon which light falls, first light conducting means having means for receiving light from the source within a solid angle having an outer limit of substantially $2\pi$ steradians and an inner limit of substantially $\pi/9$ steradians and being positioned and arranged with respect to the detector to direct a beam of light onto a portion of the detector determined by the position of the detector relative to the light source, and a second light conducting means perpendicularly related with respect to the first-mentioned light conducting means to receive light from the source within a solid angle of substantially $\pi/9$ steradians and direct a beam of light onto a portion of the detector determined by the position of the detector relative to the light source and in the same sense as the first-mentioned light conducting means.

10. A light sensing device for determining the attitude of the device relative to a light source, comprising a housing, a light sensitive detector divided into four segments mounted at one end of the housing, light receiving means for receiving light from the source and casting a beam of light on a segment of the light sensitive detector corresponding to the attitude of the detector relative to the source, the light receiving means including four elongated members extending substantially the length of the housing and each member cooperating with one of the segments and having a light gathering surface at the end of the housing opposite the light sensitive detector, said members being shaped and arranged so that the light gathering surface receives light at one side of the housing and directs the light to a segment of the detector at the opposite side of the housing.

11. A light sensing device for determining the attitude of the device relative to a light source, comprising a housing, a light sensitive detector mounted at one end of the housing and having a plurality of segments each providing an electrical signal when exposed to light, a coarse optical system for detecting the light source over a substantial solid angle and a fine optical system for detecting the light source within a relatively small solid angle, said optical systems being positioned and arranged relative to the detector to direct light from the source onto the segments to provide signals corresponding to the attitude of the device relative to the light source, the coarse optical system including a light conducting member for each segment extending substantially the length of the housing and having light directing means adjacent the detector and a light gathering surface at the end of the housing opposite the light sensitive detector, said member being shaped and arranged so that the light gathering surface receives light at one side of the housing and the directing means directs the light to a portion of the detector at the opposite side of the housing, and the fine optical system including light gathering means at the end of the housing opposite the light sensitive detector and directing light through the housing to the detector, both of said systems directing the light from the source onto the same segment of the detector when the attitude of the detector relative to the light source is in the same angular sense to maintain the same control sense between the coarse and fine optical systems.

References Cited by the Examiner

UNITED STATES PATENTS

| 2,176,554 | 10/1939 | Hardy | 88—72 |
| 2,612,817 | 10/1952 | Willcox | 250—216 X |
| 2,674,700 | 4/1954 | Small | 250—216 |
| 2,952,778 | 9/1960 | Henderson | 250—211 X |
| 2,961,545 | 11/1960 | Astheimer et al. | 88—1 X |
| 2,962,925 | 12/1960 | Karron et al. | 250—203 X |
| 3,043,179 | 7/1962 | Dunn | 88—1 |
| 3,068,772 | 12/1962 | MacNeille | 88—1 X |
| 3,090,583 | 5/1963 | Behun et al. | 250—83.3 X |
| 3,098,934 | 7/1963 | Wilson et al. | 250—203 |

RALPH G. NILSON, *Primary Examiner.*

WALTER STOLWEIN, *Assistant Examiner.*